United States Patent [19]
Schneider

[11] 3,835,351
[45] Sept. 10, 1974

[54] PHOTOGRAPHIC FLASH APPARATUS

[75] Inventor: Arthur Schneider, Volkenrode, Germany

[73] Assignee: Rollei-Werke Franke & Heidecke, Braunschweig, Germany

[22] Filed: Nov. 17, 1972

[21] Appl. No.: 307,605

[30] Foreign Application Priority Data
Nov. 25, 1971 Germany.................... 2158361
Nov. 25, 1971 Germany.................... 2158362

[52] U.S. Cl............................. 315/241 P, 315/151
[51] Int. Cl. ........................................ H05b 41/32
[58] Field of Search......... 315/151, 149, 156, 241 P

[56] References Cited
UNITED STATES PATENTS
3,696,268  10/1972  Exner.................................. 315/151
3,727,100  4/1973  Kuraishi ......................... 315/241 P

*Primary Examiner*—Ronald L. Wibert
*Assistant Examiner*—Richard A. Rosenberger
*Attorney, Agent, or Firm*—Stonebraker & Shepard

[57] ABSTRACT

Photographic flash apparatus having a flash tube, a light integrator for measuring the quantity of light reflected from the subject being photographed, and an electronic switch operated by the integrator when the cumulative or integrated total of reflected light reaches a threshold value. A thyristor in the circuit of the flash tube becomes conductive when the flash tube is flashed, and is connected to the electronic switch operated by the integrator in such a way as to become non-conductive when the threshold value is reached, thereby terminating the flash in such a way as to conserve the remaining power or energy in the main capacitor which powers the flash tube, rather than dissipating the remaining energy by short circuiting it. The gate of the thyristor is activated to render the thyristor conductive, in response to and as a result of the firing of the flash tube, rather than from a separate source. When the electronic switch is operated to terminate the flash, a negative potential is temporarily applied to the gate of the thyristor, so as to shorten the turn-off time of the thyristor.

1 Claim, 1 Drawing Figure

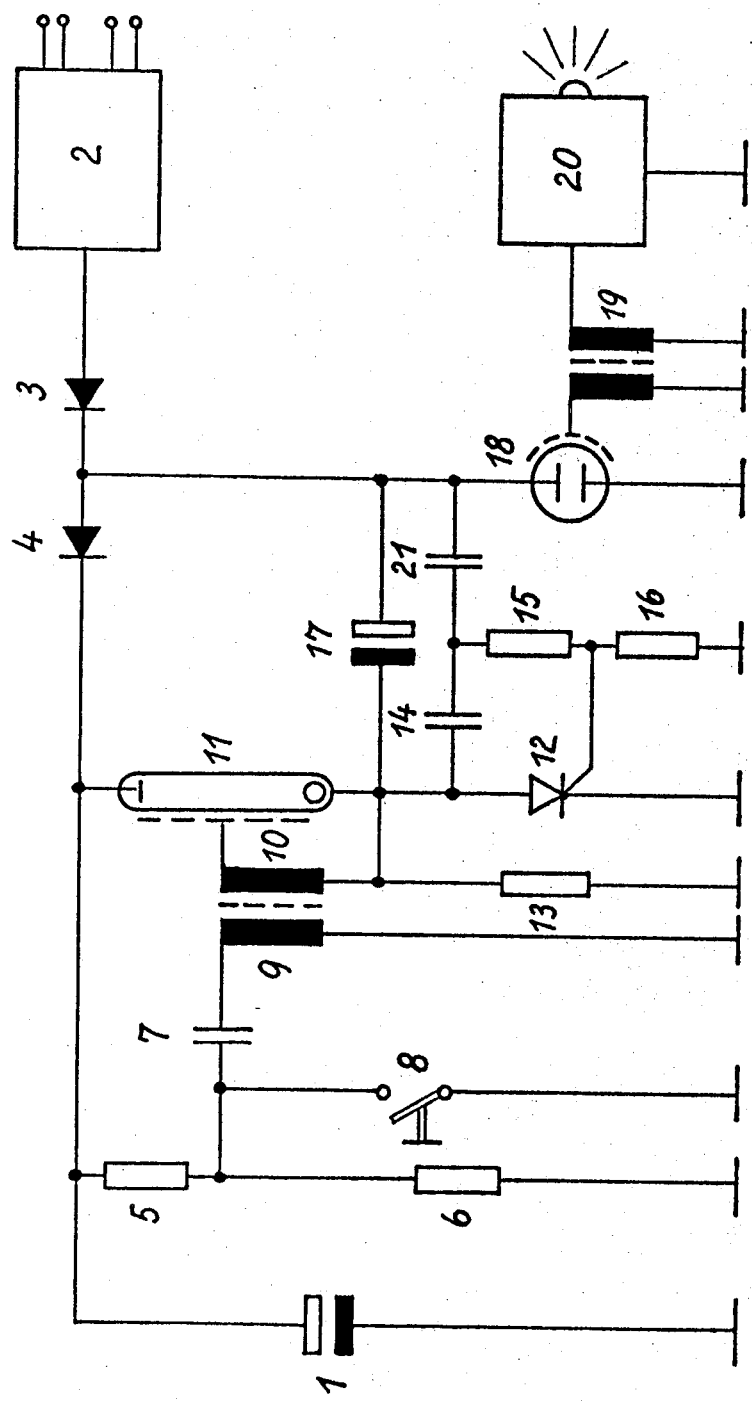

3,835,351

PHOTOGRAPHIC FLASH APPARATUS

BACKGROUND OF THE INVENTION

Electronic flash apparatus for photographic purposes is well known in the art. Examples of the prior art are Krusche and Rohmann U.S. Pat. No. 3,585,442, granted June 15, 1971, and Schneider U.S. Pat. No. 3,725,737, granted Apr. 3, 1973. It is assumed that the reader is familiar with prior art apparatus of this general kind, and that elementary principles need not be explained here.

The present invention provides an improved circuit for apparatus of this general type, which is reliable in operation, and which has the advantage, as compared with many of the prior art devices of this general kind, that when the flash is to be terminated, this is done by opening the circuit through the flash tube, to stop flow of current, rather than by short circuiting the power capacitor through a quench tube, as is done by many of the prior art devices. When the flash is terminated by short circuiting, this dissipates the remaining unexpended energy in the main power capacitor, so that it must be recharged substantially from a zero condition. With the present apparatus according to the present invention, any power not already used in the flash is not dissipated upon termination of the flash, but is conserved in the capacitor, so that the capacitor must be recharged (for the next flash) only from a condition already partly charged. This gives longer life to the battery (or other power source) which is used for recharging the capacitor. The present invention provides a particularly advantageous circuit for accomplishing this.

BRIEF DESCRIPTION OF THE DRAWING

The single FIGURE of the drawing is a schematic wiring diagram illustrating the circuitry of the present invention.

DESCRIPTION OF THE PREFERRED EMBODIMENT

The storage capacitor 1, which is the main capacitor for powering the flash tube, is charged by the transducer 2 via the diodes 3 and 4. The diode 4 separates the flash circuit from the extinction circuit. A voltage divider 5, 6 for deriving the primary ignition voltage for the capacitor 7 is connected parallel to the storage capacitor 1. The release means 8 is in series with the ignition capacitor 7 and the primary winding 9 of the ignition transformer. When the contact or switch 8 is closed, the capacitor 7 discharges via the primary winding 9 of the transformer. The secondary winding 10 of the transformer produces the firing potential for the flash tube 11. The above mentioned contact 8 is the switch which is to be closed for initiating the flash, and is usually a switch built into the camera shutter so that it will be closed in synchronism with the operation of the camera shutter, as well understood in the art.

A thyristor 12 is in series with the flash tube 11. A resistor 13 is connected in parallel with the thyristor, as shown. Also in parallel with the thyristor is the series connected arrangement of a capacitor 14 and a voltage divider 15, 16, the gate of the thyristor being connected to the voltage divider, as shown. Furthermore, an extinction capacitor 17 is connected parallel to the thyristor, as shown, and connected to an electronic switch 18 which can be ignited, via an ignition transformer 19, by the photoelectric measuring device or light integrator 20. The electronic switch 18 is normally non-conducting or open, and becomes conducting or closed when igniting by an impulse from the transformer 19, such switches being well known in the art.

The extinction capacitor 17 requires a much lower or smaller capacitance than the main storage capacitor 1. Between the capacitor 14 and the switching tube 18 there is yet another capacitor 21, connected as illustrated, the capacitance of which capacitor 21 being considerably greater than that of the thyristor firing capacitor 14. The thyristor 12 is triggered by the capacitor 14 and the resistance 15, 16 at the instant of firing the flash tube 11. This combination has the effect of a differentiation, i.e., a rapid voltage rise (when the flash tube 11 is fired) is transmitted via the capacitor 14 and the resistance 15, 16 to the gate of the thyristor 12. A slow voltage rise (during recharging of the extinction capacitor 17) encounters a high apparent resistance in the capacitor 14 and therefore produces only a weak signal which is not sufficient to trigger the thyristor 12.

The anode of the thyristor 12 and the cathode of the flash tube 11 are connected to ground via the resistor 13, and during the normal rest period their potential is zero. This potential rises abruptly upon ignition of the flash tube 11. This rapid voltage rise is transmitted via the capacitor 14 and the resistance 15, 16 to the gate of the thyristor 12 and fires the thyristor. The thyristor then completes the build-up of the anode potential and accepts the flash current.

When the flash is to be terminated (as for example, when the integrator 20 reaches its threshold value) the switching tube 18 is fired. The capacitor 17 is thereby discharged. This discharge current is opposed to the flash current, and since this current in this low-ohmic circuit can be stronger than the flash current, the anode current in the thyristor 12 may even become negative for a brief period of time. Since at this point in time no signal is applied to the thyristor 12, the latter is non-conductive. Subsequently, however, the anode potential rises again, via the flash bulb, but because of the recharging of the capacitor 17 this rise is considerably slower. As it is, a triggering voltage for the thyristor 12 could again build up at the resistance 16, via the capacitor 14. But the combination of capacitor 14 with the resistance 15, 16 is so calculated that with the given slower voltage rise a potential which would be sufficient to trigger the thyristor 12 does not develop at the resistance 16.

Thus by virtue of this comparatively simple circuit arrangement, the thyristor 12 is triggered or fired once by the flash current at the start of the flash. Furthermore, the triggering potential is additionally reduced to zero when the thyristor 12 is extinguished, and a renewed rise of the triggering potential to thyristor-igniting voltage is prevented. It is, of course, a condition of the functioning of the arrangement that the anode current must be zero or negative for a specific interval, i.e., for such a length of time as is required for clearing the PN-transition, that is, for as long as it takes for the thyristor to become free or vacant. This process of clearing the thyristor or this period of becoming free, can be shortened if the gate of the thyristor is negatively biased during this period. It is for this purpose that the capacitor 21 is provided, the capacitance of which must be very much greater than that of the ignition capacitor 14. Since this capacitor 21 is connected to the anode of the extinction capacitor 17 or to the anode of the switching tube 18, it is co-discharged upon ignition of the switching tube 18. Its discharge current produces, via the resistance 16 and thus at the gate of the thyristor 12, a negative potential. The resistance 15 delays this process. The extent of the negative potential is thus confined within limits, and the effect of the negative potential remains for some time at the gate of the thyristor 12.

The capacitor 21 assumes yet another function or task. During the extinction process the discharge current of the capacitor 21 also negatively modulates the capacitor 14, so no triggering signal can develop at the thyristor. As a result of the additionally shortened time of becoming vacant or free, the capacitance of the extinction capacitor 17 can be reduced; that is, the inevitable loss of energy is reduced, and the recharging time of the capacitor 17 is, of course, shortened.

The inventive ignition of the thyristor has additional advantages. When the thyristor is triggered by the synchro-contact 8 along with the flash tube, the chatter which is often present in a synchro-contact may have a detrimental effect on the triggering. Such faulty triggering could destroy the thyristor. In the past, the triggering signal had to be prepared, which generally necessitated the use of active structural elements. Moreover, there was a lengthy time interval between ignition of the flash tube and formation of the flash current as compared to ignition of the thyristor, for the triggering potential must be applied to the thyristor until the flash current flows. In the present circuit, however, the thyristor is only triggered when the flash tube is already fully lit. Consequently, when there is a failure to fire, the extinction devices are not activated so that waiting periods (for recharging) can be avoided. Furthermore, the triggering signal has shape which can be determined by dimensioning, and is always reproducable in the same shape. In the arrangement according to the present invention, these problems require an unusually low circuitry expenditure.

It is seen from what has been said above that when the flash is terminated, any residual charge remaining on the main capacitor 1 is conserved rather than being dissipated by short circuiting. The thyristor in series with the flash tube permits the interruption of the flash current by a short pulse, because of the very brief time of recovery of the thyristor in comparison to the flash tube. Moreover, initiation of a pulse potential which need only correspond to the voltage drop of the flash current on the thyristor, is sufficient. Thus a capacitor of low capacitance is sufficient for producing this pulse. The energy of the main storage capacitor which has not already been used up during the flash, remains almost entirely preserved.

It is also seen that the ignition of the thyristor and the flash tube do not result simultaneously from a common firing device, but rather the ignition of the thyristor results from the firing of the flash tube. The sudden rise in voltage upon ignition of the flash tube serves to trigger the thyristor, while other slower or weaker signals remain ineffective on the thyristor. Such signals can appear when the thyristor is extinguished by reduction of the anode potential to a negative value. When the anode potential rises again, a triggering potential would again arrive at the gate of the thyristor, as upon ignition of the flash tube, but since the arrangements according to the present invention cannot respond to a slow rise, a gate potential sufficient for firing the thyristor under these conditions cannot be produced, and so there can be no faulty operation. After extinction of the thyristor and after the temporary reduction of the anode potential to zero or to a negative value, the slowly rising voltage cannot grow so far as to produce the triggering potential for the thyristor.

What is claimed is:

1. Electronic flash apparatus for photographic purposes, comprising a flash tube (11) having an anode and a cathode, a thyristor (12) connected in series with said flash tube, said thyristor having an anode connected to the cathode of the flash tube, said thyristor also having a gate, a storage capacitor (1) in parallel with said flash tube and thyristor, for furnishing power to said flash tube, means (7, 8, 9, 10) for rendering said flash tube conductive to cause it to flash, a switch tube (18) in parallel with said storage capacitor, a light integrator (20) having a threshold value and effective, when it reaches a threshold value of integrated light, to render said switch tube conductive, an extinction capacitor (17) connected between the cathode of said flash tube and an anode of said switch tube, another capacitor (21) having one side connected to an anode of said switch tube (18) a voltage divider circuit having two resistors (15, 16) in series with each other, said voltage divider circuit being connected from a cathode of said thyristor and a cathode of said switch tube to the other side of said other capacitor (21) and a connection from a central tap of said voltage divider circuit to said gate of said thyristor.

* * * * *